(12) United States Patent
Heselhaus

(10) Patent No.: US 7,172,242 B2
(45) Date of Patent: Feb. 6, 2007

(54) MOTOR VEHICLE

(75) Inventor: Udo Heselhaus, Ibbenbüren (DE)

(73) Assignee: Wilhelm Karmann GmbH, Osnabrück (DE)

( * ) Notice: Subject to any disclaimer, the term of this patent is extended or adjusted under 35 U.S.C. 154(b) by 95 days.

(21) Appl. No.: 10/531,685

(22) PCT Filed: Oct. 10, 2003

(86) PCT No.: PCT/DE03/03369

§ 371 (c)(1),
(2), (4) Date: Apr. 15, 2005

(87) PCT Pub. No.: WO2004/037575

PCT Pub. Date: May 6, 2004

(65) Prior Publication Data

US 2006/0012223 A1    Jan. 19, 2006

(30) Foreign Application Priority Data

Oct. 17, 2002    (DE) ............... 102 48 346

(51) Int. Cl.
*B60J 7/00* (2006.01)

(52) U.S. Cl. .................. 296/219; 296/107.09

(58) Field of Classification Search ............... 296/219, 296/107.09, 107.16, 116, 107.15
See application file for complete search history.

(56) References Cited

U.S. PATENT DOCUMENTS

| | | | | |
|---|---|---|---|---|
| 5,052,747 A * | 10/1991 | Kubota et al. | ............... | 296/219 |
| 5,054,847 A * | 10/1991 | Asoh et al. | .................. | 296/219 |
| 5,944,378 A * | 8/1999 | Mather et al. | ............... | 296/219 |
| 6,033,012 A * | 3/2000 | Russke et al. | ............... | 296/219 |
| 6,428,090 B1 * | 8/2002 | Reinsch | ...................... | 296/219 |
| 2005/0280290 A1 * | 12/2005 | Urban et al. | ................. | 296/219 |
| 2005/0280292 A1 * | 12/2005 | Reitzloff et al. | ............ | 296/219 |
| 2006/0061129 A1 * | 3/2006 | Dilluvio | ................ | 296/107.09 |

* cited by examiner

*Primary Examiner*—Kiran B. Patel
(74) *Attorney, Agent, or Firm*—Friedhelm Kueffner

(57) ABSTRACT

The invention relates to a motor vehicle (1) provided with a roof (2) comprising at least one part (3) thereof which is fully movable for the opening thereof and extends from an area adjacent to a wind screen frame (4) to the rear particularly rigid part (5) of the roof transversely covering the entire width between the upper edges of the side windows (7) of said motor vehicle. The inventive motor vehicle is characterised in that the movable part (3) of the roof can be arranged in the fully opened position thereof above the rear rigid part (5) of the roof.

11 Claims, 17 Drawing Sheets

MOTOR VEHICLE

The invention concerns a motor vehicle with a roof, which has at least one part that is fully movable to allow the roof to be opened and that occupies the entire width in the transverse direction of the roof between the upper edges of the side windows, in accordance with the introductory clause of claim 1, and a motor vehicle in accordance with the introductory clause of claim 2.

DE 199 26 474 A1 describes a convertible that allows two roof positions, namely, a completely closed position and a completely open position, especially in a high construction vehicle. To this end, the roof is divided transversely into several roof sections arranged one behind the other. However, besides the two specified roof positions, no others are possible. The rear roof part serves as an upper covering for a cover of the folding-top compartment and thus necessarily makes an acute angle with the direction of travel as it is opened. As a result, it presents, a large surface of attack to the airflow over the vehicle, so that the conversion of the roof from its closed position to its open position and vice versa must be carried out with the vehicle stopped or nearly stopped. The opening or closing takes a long time, because it is necessary not only to stow the front roof parts below the cover of the folding-top compartment when the roof is being opened or remove them from this location when the roof is being closed, but also to move the folding-top compartment as a whole down or up, respectively.

The invention is based on the problem of creating a motor vehicle that has a high degree of flexibility with respect to the opening of the roof parts.

The invention solves this problem with a motor vehicle that has the features of claim 1 and with a motor vehicle that has the features of claim 2. Advantageous modifications of the invention are specified in the dependent claims 3 to 12.

The design in accordance with claim 1 permits a lowered position of the opened front roof part in which reduction of the trunk space in the rear section of the vehicle is completely avoided. At the same time, due to the fact that the width of the lowered roof part extends to the side windows, a good open-air feeling can be produced, especially if the side windows are also lowered when the roof part is open. The front roof part can be opened quickly, since basically only a roof section that is horizontal in the closed state of the roof must be moved, while the roof otherwise remains motionless.

In the design in accordance with claim 2, the lowered position of the opened roof part can be selected, for example, after the trunk has been loaded. It is also possible, say, for a short-distance trip, to select a quick roof opening, in which the air resistance of the vehicle may then possibly be increased, or for a long-distance trip, to select the second lowered position of the roof, in which the opened roof part is stored below the rear roof part.

In accordance with the invention, the movable roof part either can consist of rigid roof parts or can be covered with a textile covering.

Whether the rear roof part can also be lowered into the automobile body to create a convertible, or only a partial opening of the roof is to remain possible, e.g., in the manner of a targa-top vehicle, is independent of the type of roof part lowering of the invention. Therefore, this type of lowering can be used for a wide variety of roofs and thus allows maximum flexibility.

It is advantageous that it is also possible for the rear roof part of a vehicle to be optionally lowered, or, if, for example, more storage space is needed, to remain in the targa position.

Even when the lowered front roof part is held below the rear roof part, a rigid, stationary—and thus less expensive—roll bar can remain in place. The roll bar can be mounted on the automobile body independently of the roof parts that are to be moved. A space for the passage of the front roof part that is to be lowered is advantageously created between the roll bar and the opened rear roof part.

It is especially advantageous to create another opening possibility for the front, movable roof part, in which only the rear section of the latter is raised. As a result of the fact that when the rear section of this roof part is raised, the roof part remains otherwise closed, an especially low-draft ventilation position can be realized. The total opening movement does not have to be initiated to allow the partial opening in the rear section, so that the mechanism for the partial opening can be kept simple. Another advantage is that the airflow attack surface is minimized, so that the movement into the raised position and the return movement are also possible while the vehicle is moving, even at high speeds.

Other advantages and features of the invention are apparent from the specific embodiment of the object of the invention that is illustrated in the drawings and described below.

Figure 1:
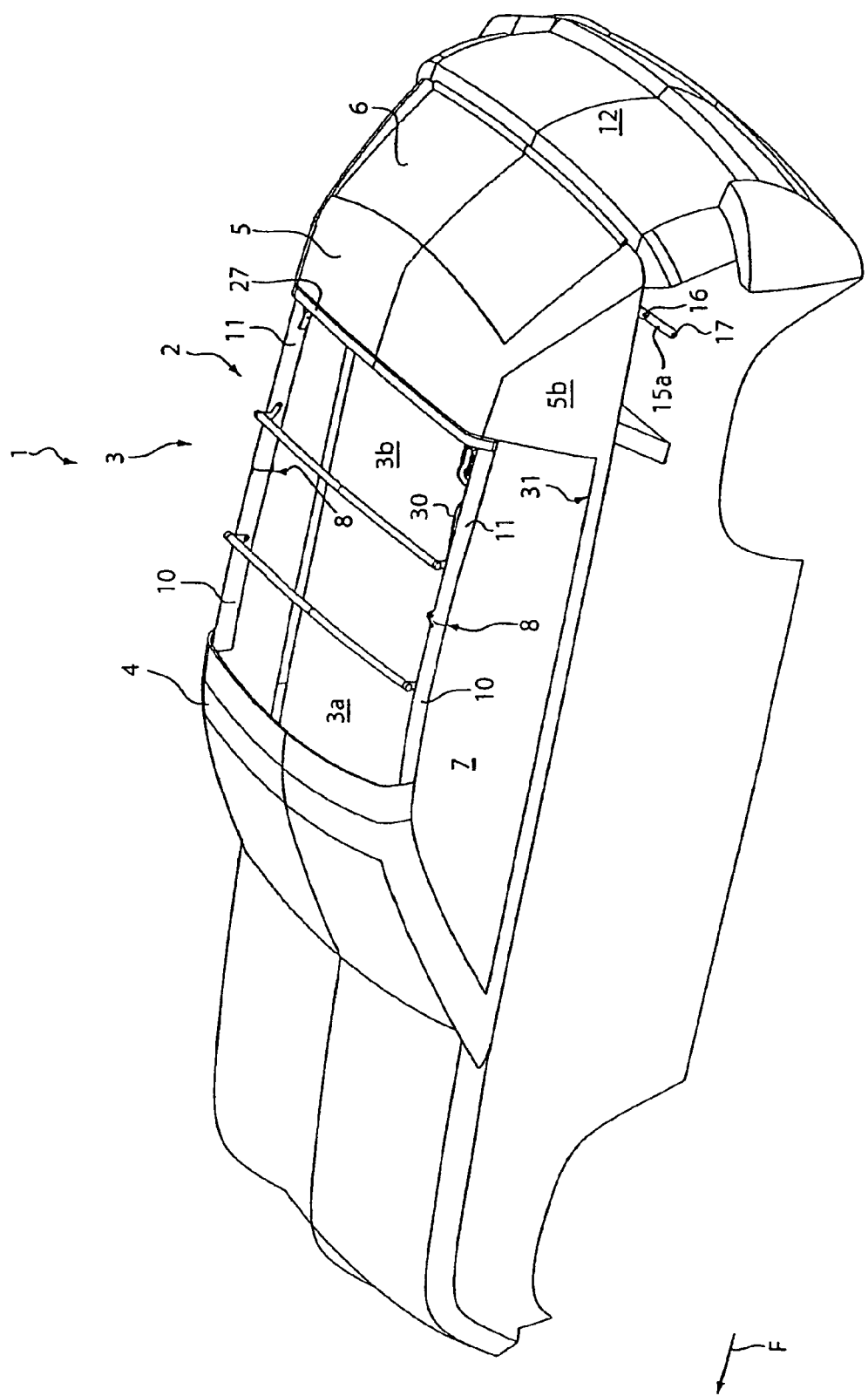
FIG. 1 shows a schematic, perspective overall view of a motor vehicle of the invention with the roof closed but without the textile roof covering.

The roof parts 3 and 5 can be moved independently of each other. The roof part 3 is movably connected with the automobile body by lateral linkages 13, each of which is designed as a four-bar linkage. In this regard, each side of the vehicle is provided with two linkages 14, 15, which are pivoted on bearings 16, 17 that are fixed with respect to the automobile body. Details of this are illustrated in FIGS. 11 to 16.

Figure 11:
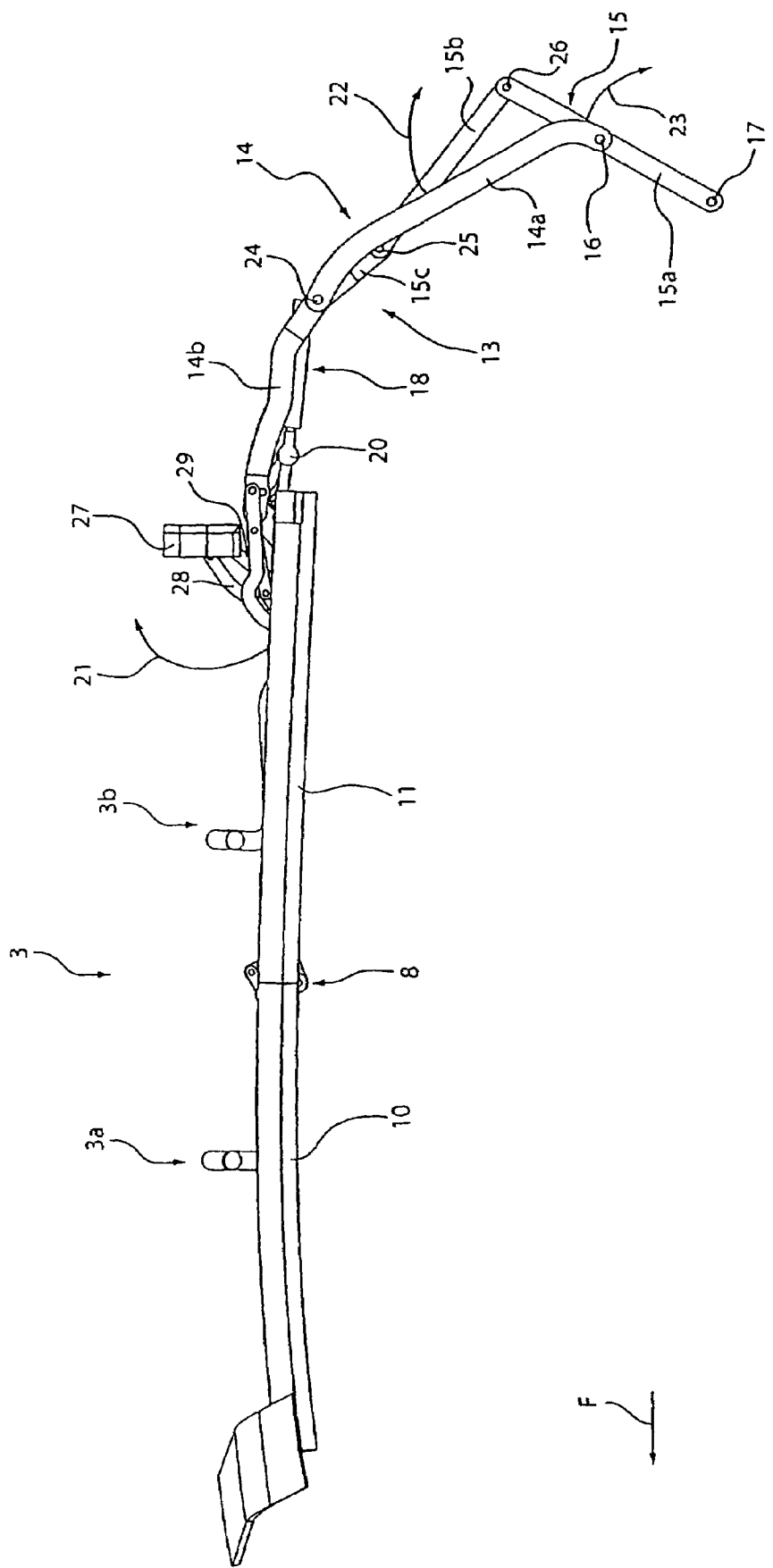
FIG. 11 shows the roof linkage in the roof position according to FIG. 2 in a schematic side view.
Figure 12:
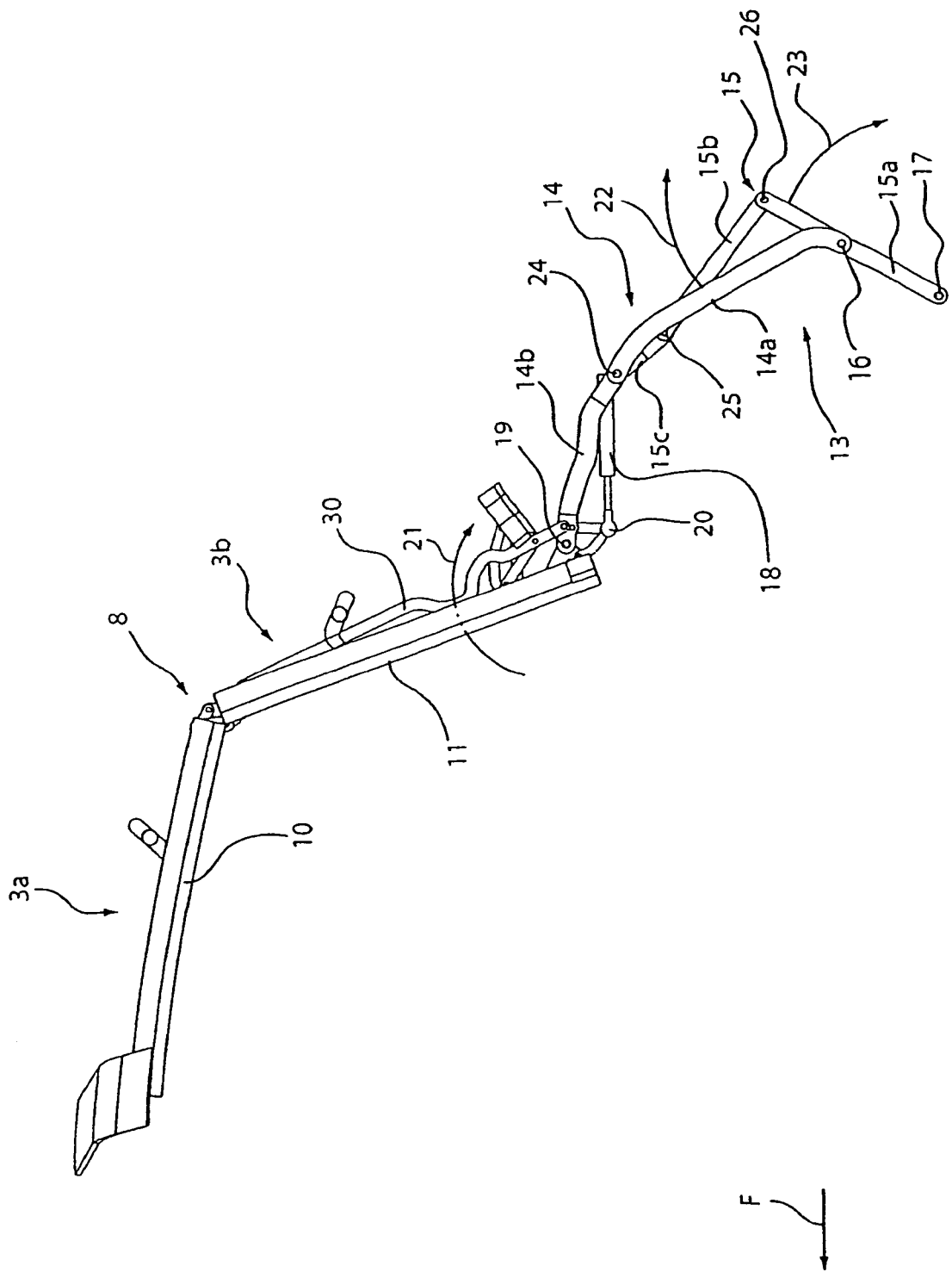
FIG. 12 shows the roof linkage in the roof position according to FIG. 4 in a schematic side view.
Figure 13:
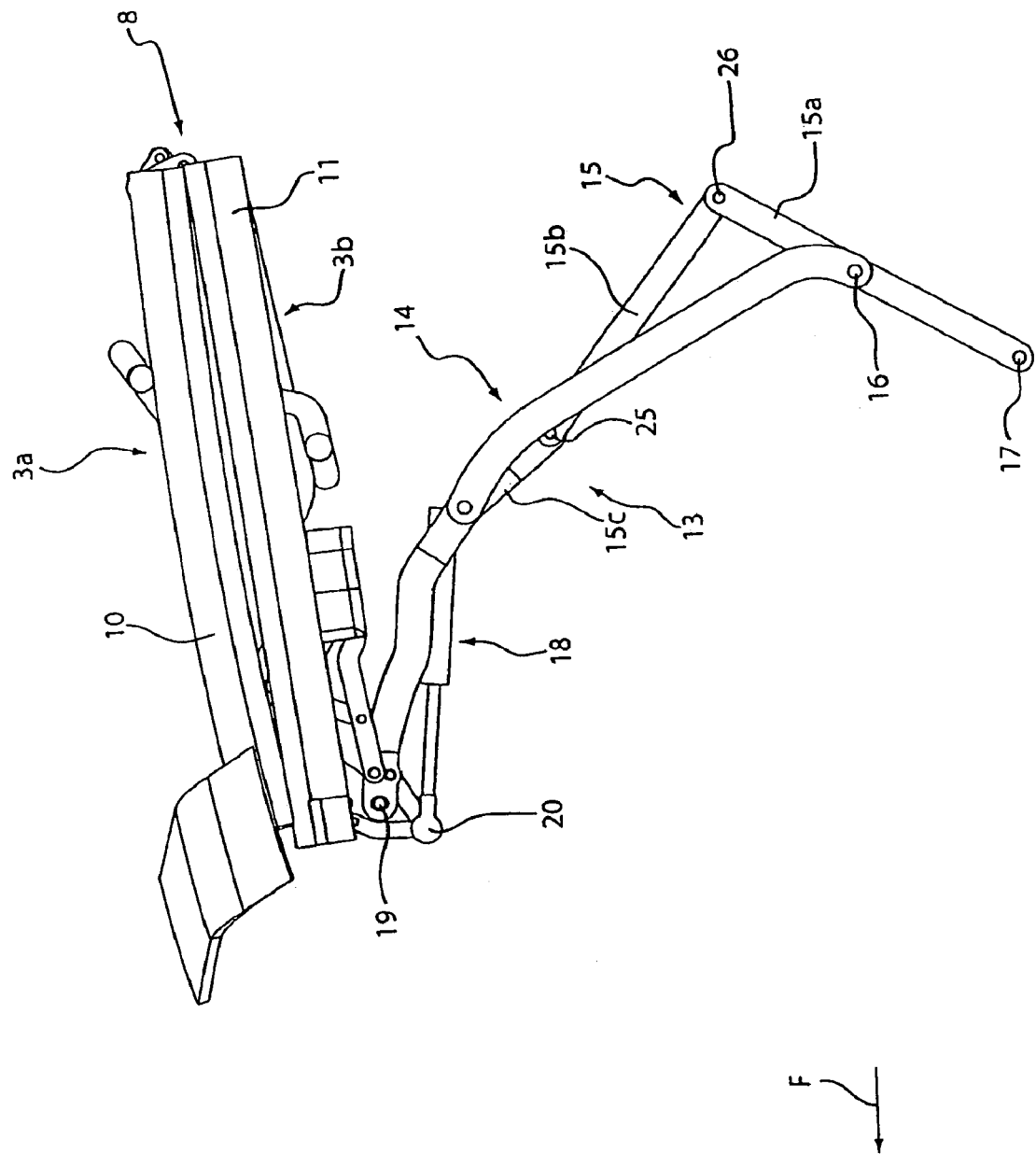
FIG. 13 shows the roof linkage in the roof position according to FIG. 5 in a schematic side view.

The linkage 15 acts on a joint 20 of the front roof part 3 by means of a drive element 18. The joint 20 is assigned to the rear end of the longitudinally extending frame part 11. The linkage 14, on the other hand, acts indirectly on the frame part 11 by means of a horizontal pivot axis 19 that is located at a vertically higher level. The height displacement of the points of force application 18 and 20 results in a lever arm, by which the frame part 11, when the drive element 18 is moved out, can be swiveled in the direction of arrow 21 about the axis 19, which remains motionless to effect the first lowered position of the roof. In this way, the front roof part 3 can be opened into the first lowered position (FIGS. 11 to 13).

Figure 14:
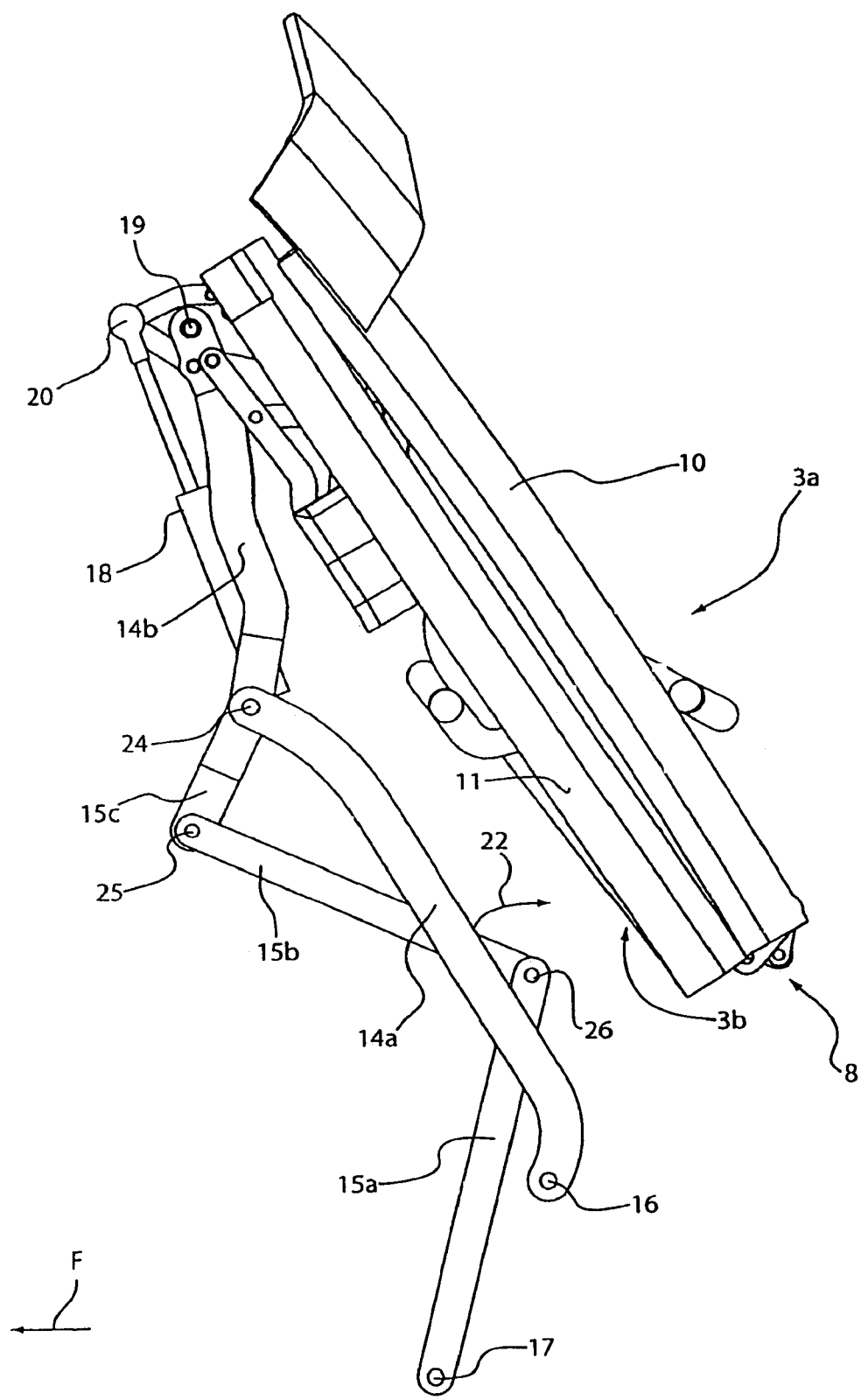
FIG. 14 shows the roof linkage in the roof position according to FIG. 6 in a schematic side view.
Figure 15:
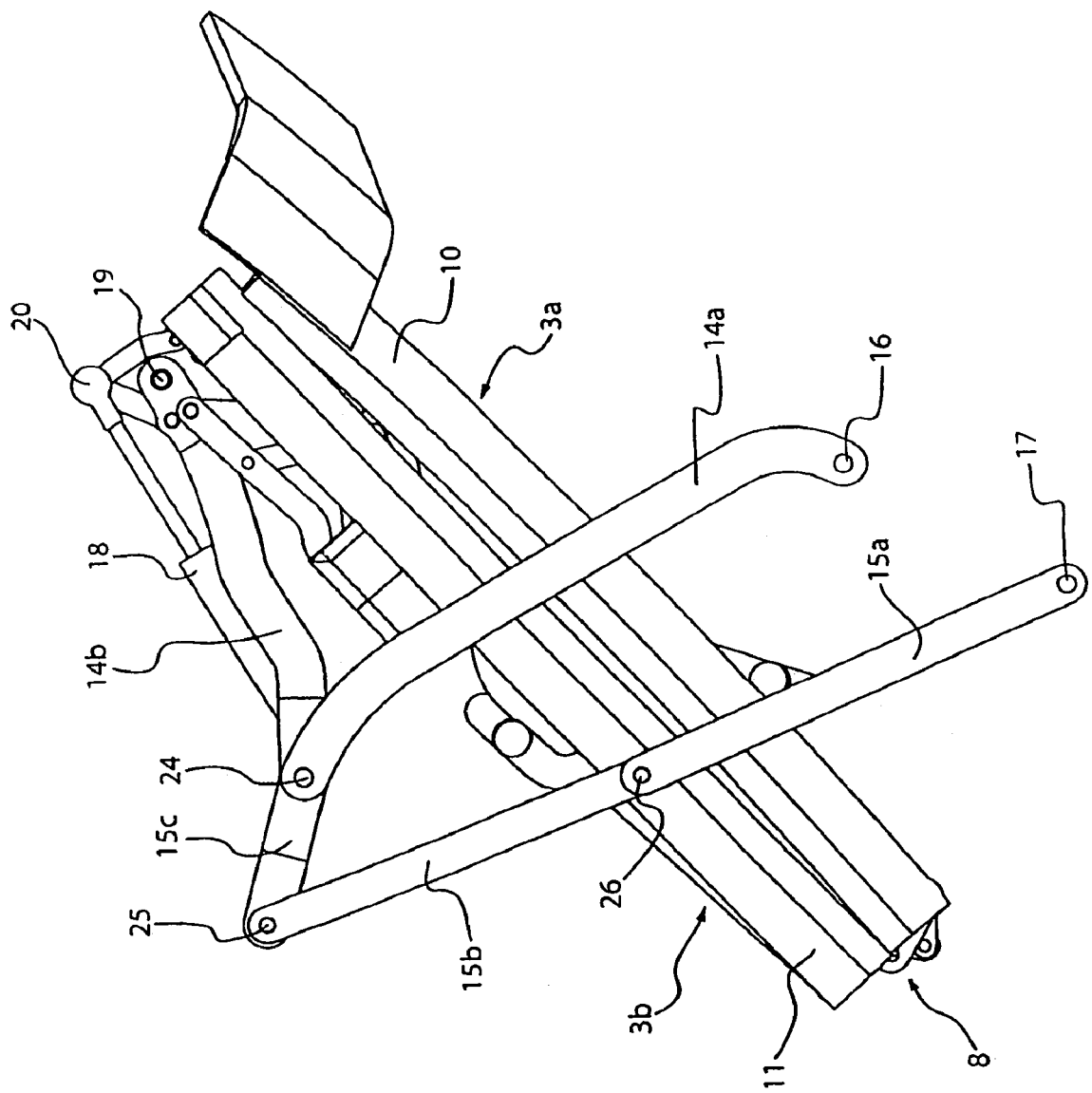
FIG. 15 shows the roof linkage in the roof position between FIGS. 6 and 7 in a schematic side view.
Figure 16:
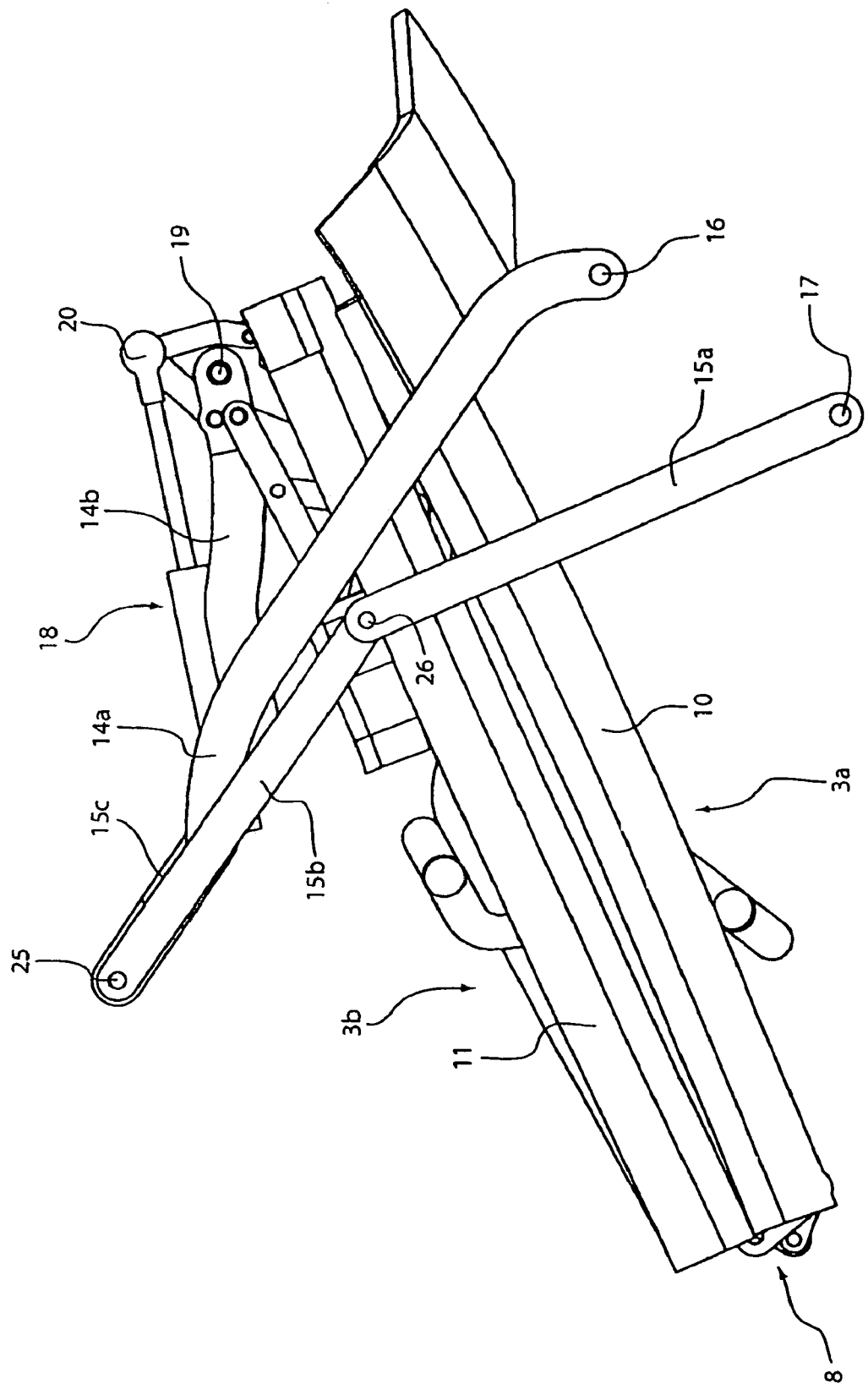
FIG. 16 shows the roof linkage in the roof position according to FIG. 7 in a schematic side view.

In addition, the linkages 14 and 15 can also be swiveled about the axes 16 and 17, which are fixed with respect to the automobile body, in the directions of arrows 22, 23 and in the opposite directions (FIGS. 14 to 16).

The linkage 14 is divided into sections 14a and 14b at at least one additional joint 24. Section 14a extends from the main bearing 16, which is fixed with respect to the automobile body, to the joint 24, and section 14b extends from there to the axis 19. The linkage 15 is divided at at least two joints 25, 26. Section 15a extends from the main bearing 17, which is fixed with respect to the automobile body, to the joint 26, section 15b extends from there to the other joint 25, and section 15c extends from there to the drive element 18. The pivoted attachment of section 15c to the drive element 18 is located on a common horizontal pivot axis with the joint 24 of the first linkage 14.

Figure 3:
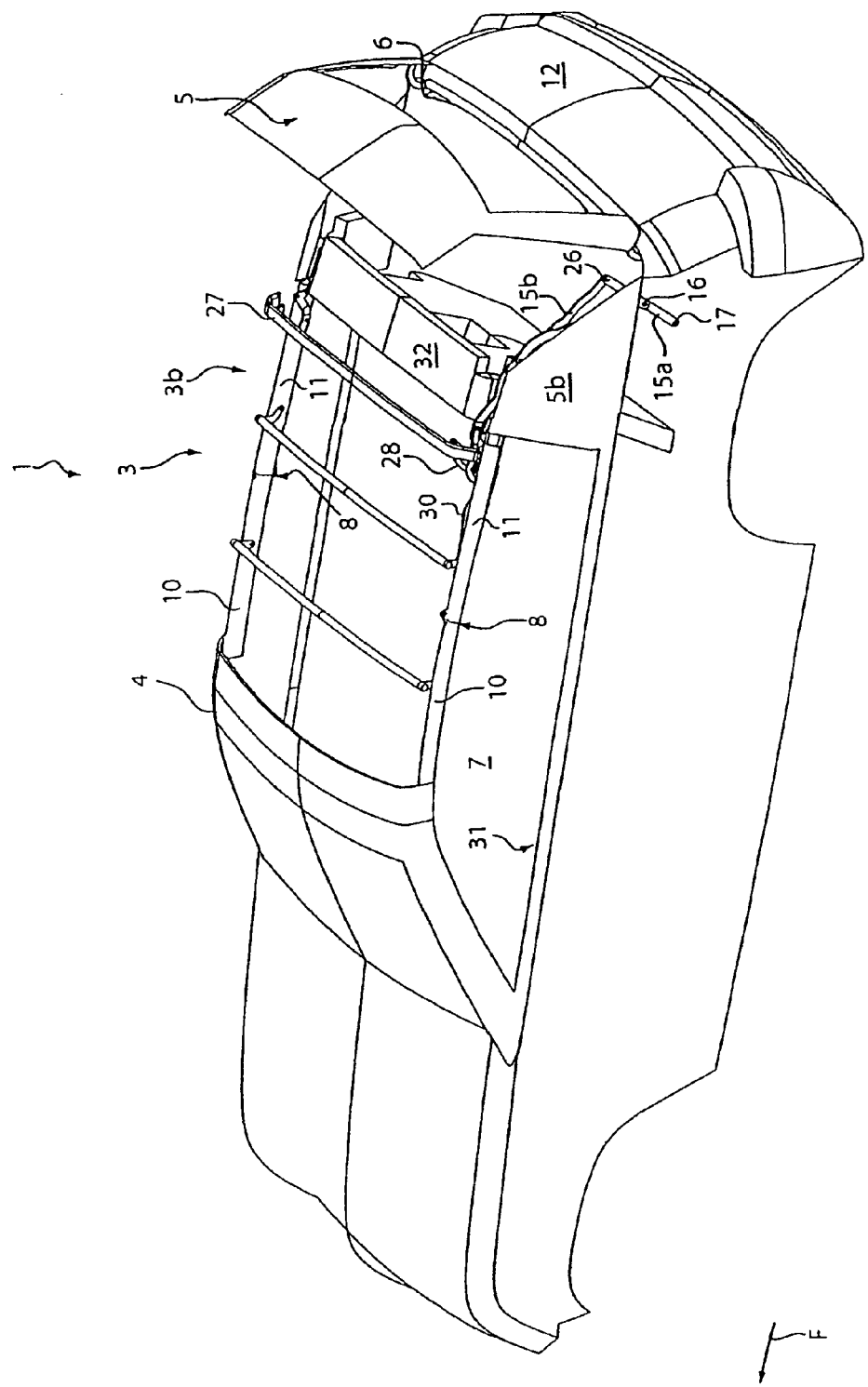
FIG. 3 shows a view similar to that of FIG. 2 with the rear roof part swung upward.
Figure 3A:
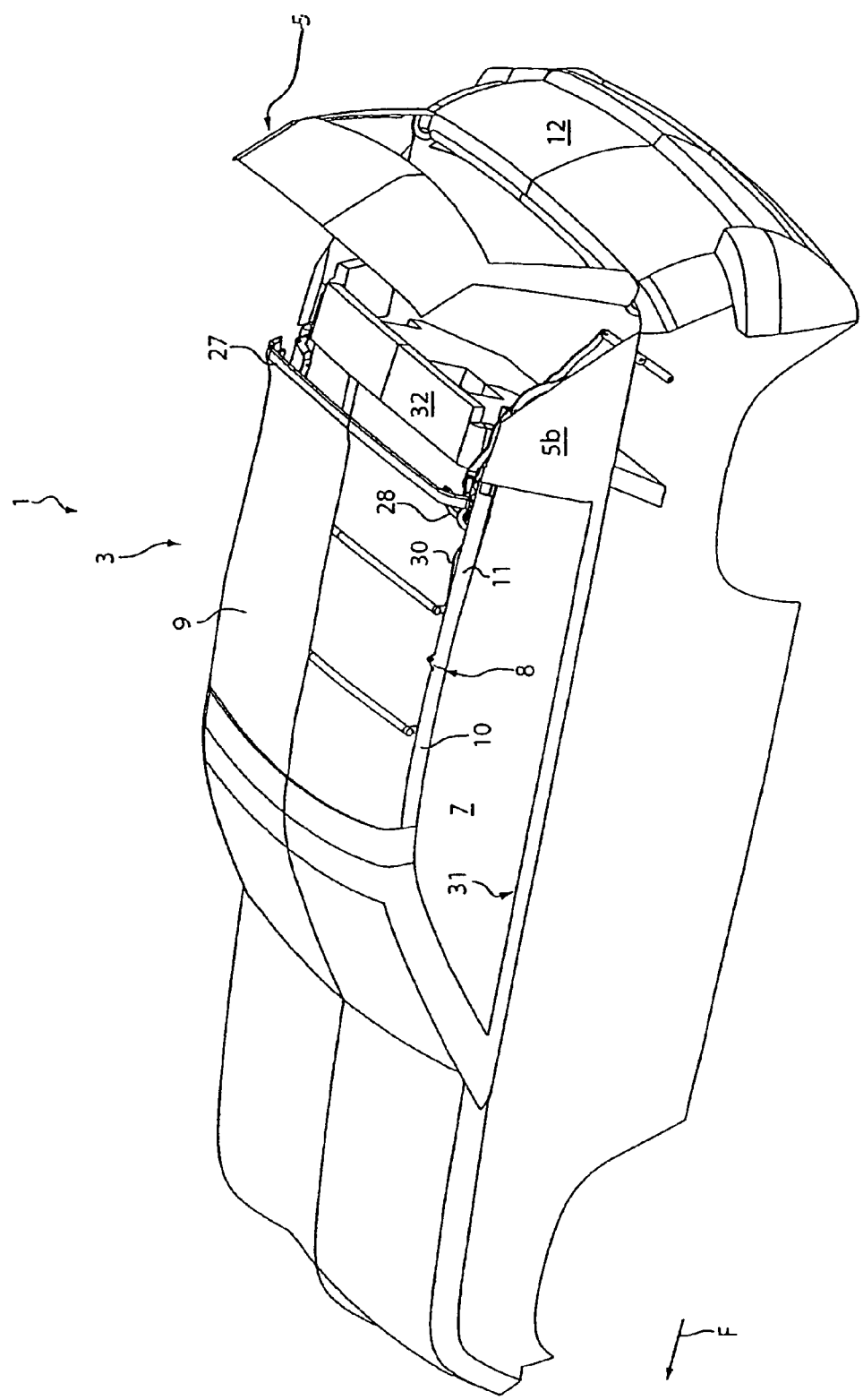
FIG. 3a shows the same state of movement of the roof as FIG. 3 but with the textile covering of the front roof part partially drawn.
Figure 4:
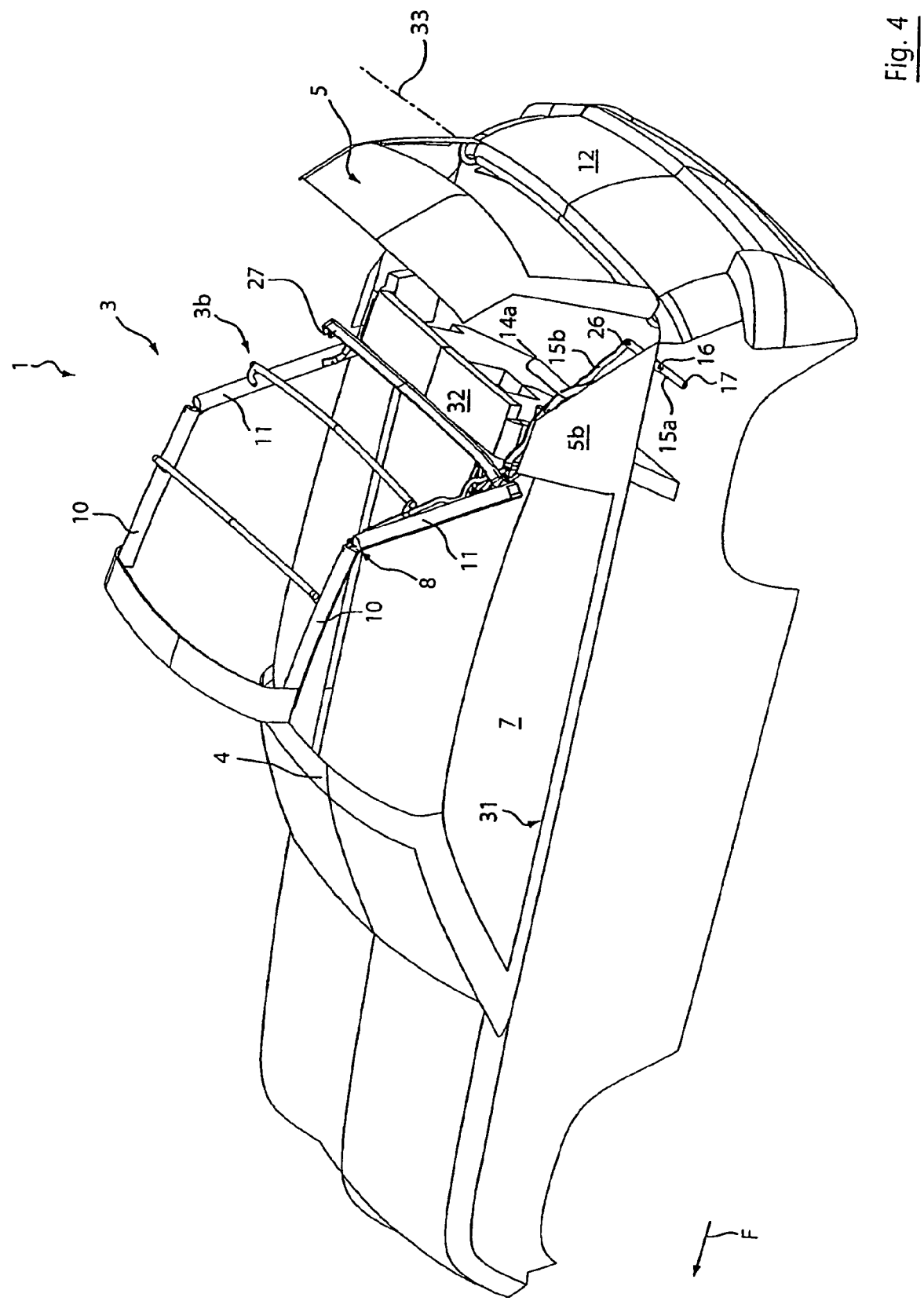
FIG. 4 shows a view similar to that of FIG. 3 with the opening of the roof progressing by the front roof part being swung up and folded.

In the present embodiment, a rear transverse roof bow 27, which can be moved relative to the lateral frame parts 10, 11 and is mounted on two levers 28, 29 that extend parallel to the frame part 11, is assigned to the roof section 3, which is covered with a textile material. By raising these levers, the roof bow 27 can be displaced with unchanged orientation essentially parallel upward and forward with respect to the travel direction F. This results in the raising of the rear edge region of the roof part 3, so that a ventilation position is reached. This position can also be set during travel, since the movement of the levers 28, 29 does not require much force, and the textile covering 9 (FIG. 3a), which then rises only in the rear section, presents only a small surface of attack to the airflow over the vehicle. Therefore, the opening and closing of this ventilation opening can also be carried out at high speed. The movement of the roof bow 27 takes very little time. In its normal lowered position, the roof bow 27 clamps the covering 9 and seals its rear termination against the rear roof part 5.

Figure 2:
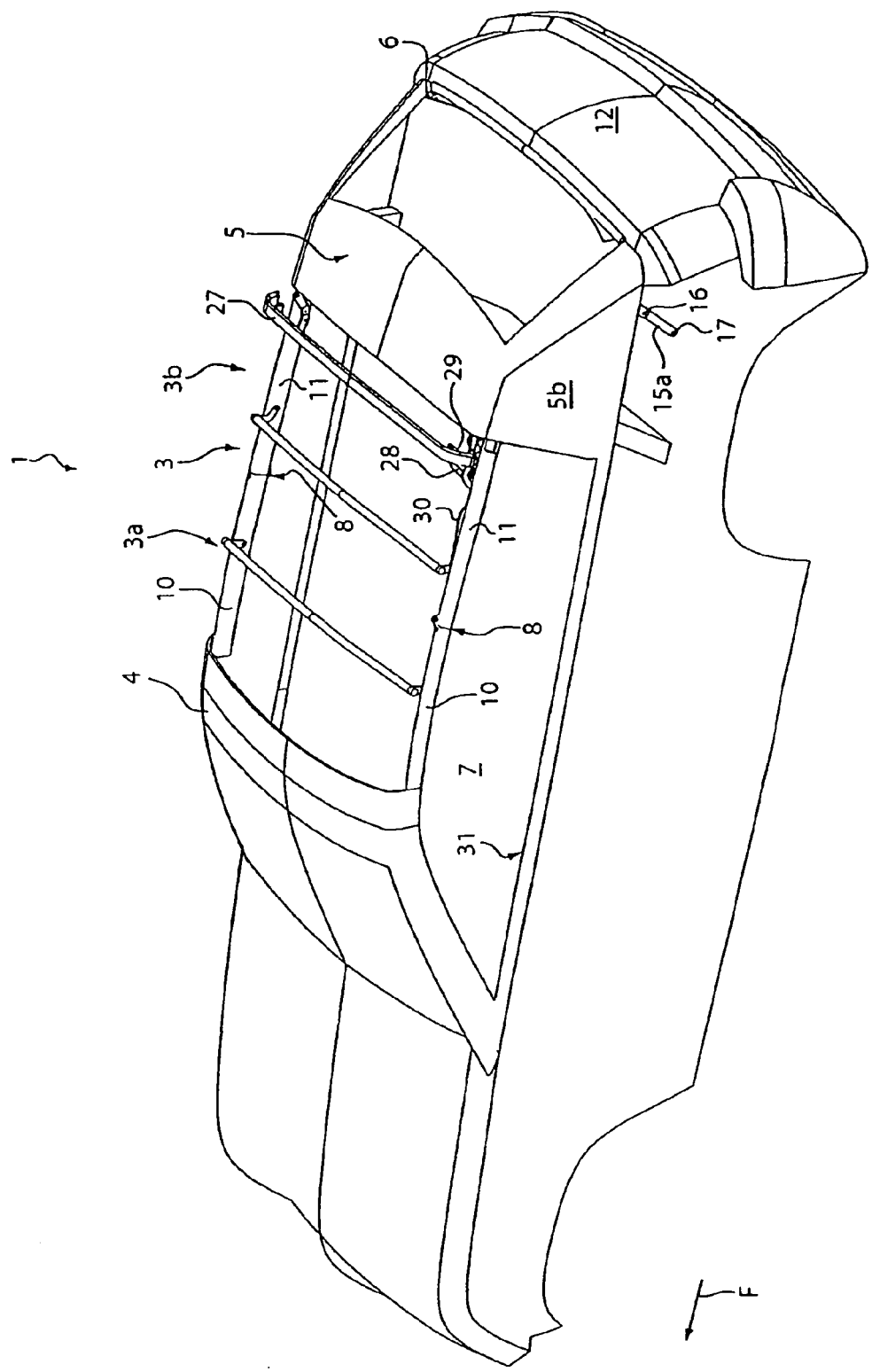
FIG. 2 shows a view similar to that of FIG. 1 with the rear end of the front roof part raised.
Figure 8:
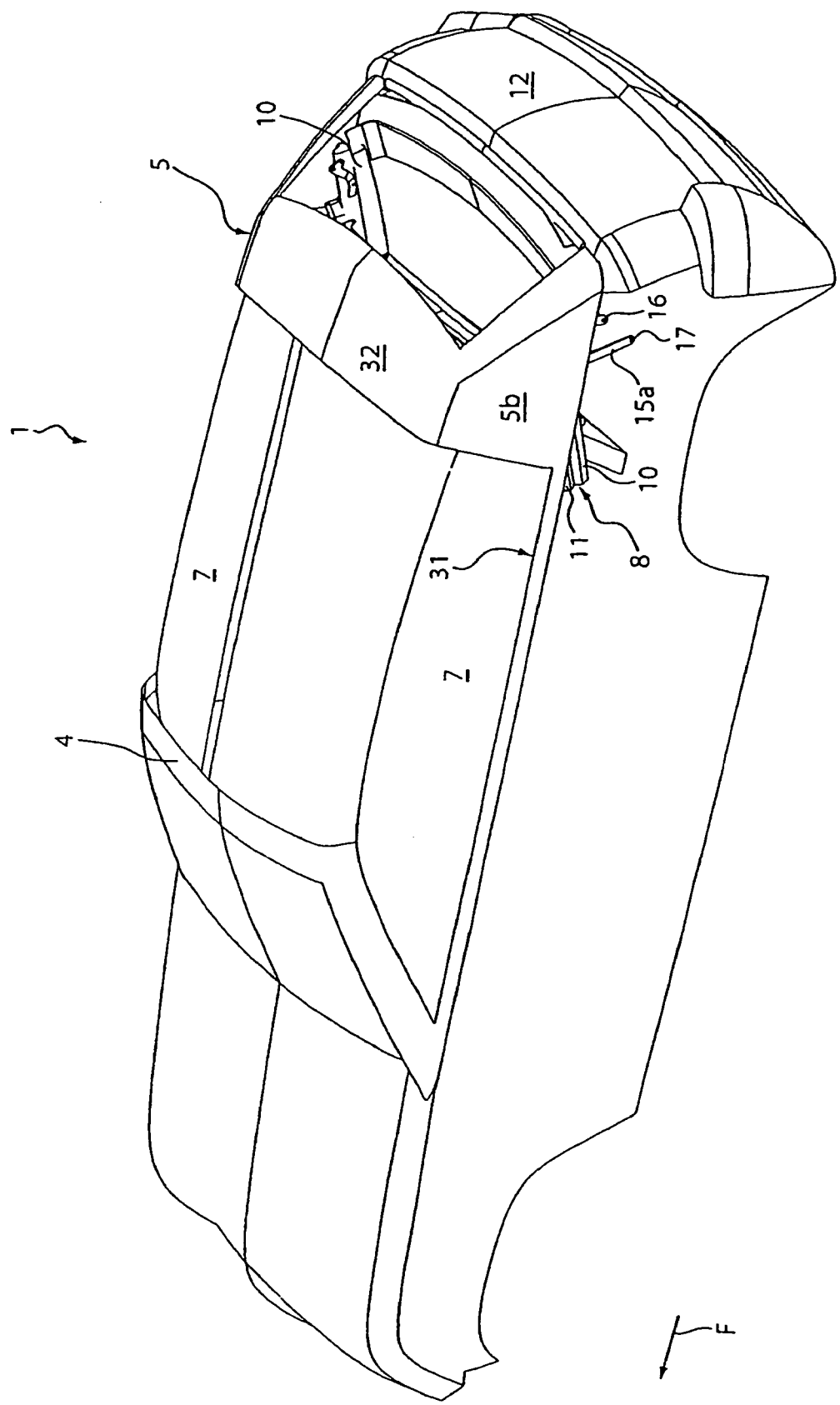
FIG. 8 shows a view similar to that of FIG. 7 with the position of the front roof part unchanged and the rear roof part swung back into its original position.
Figure 9:
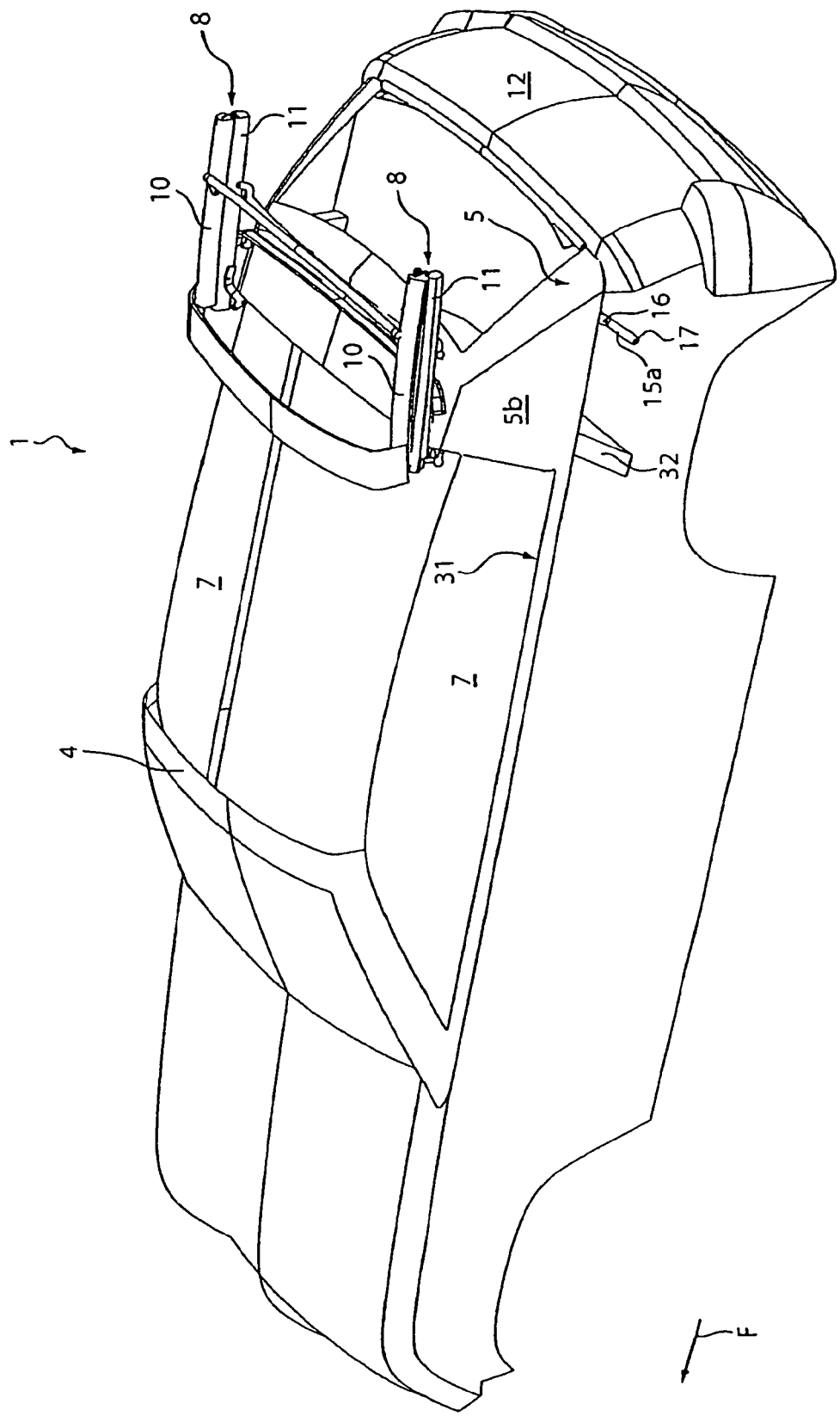
FIG. 9 shows an alternative lowered position of the front roof part above the rear roof part.
Figure 10:
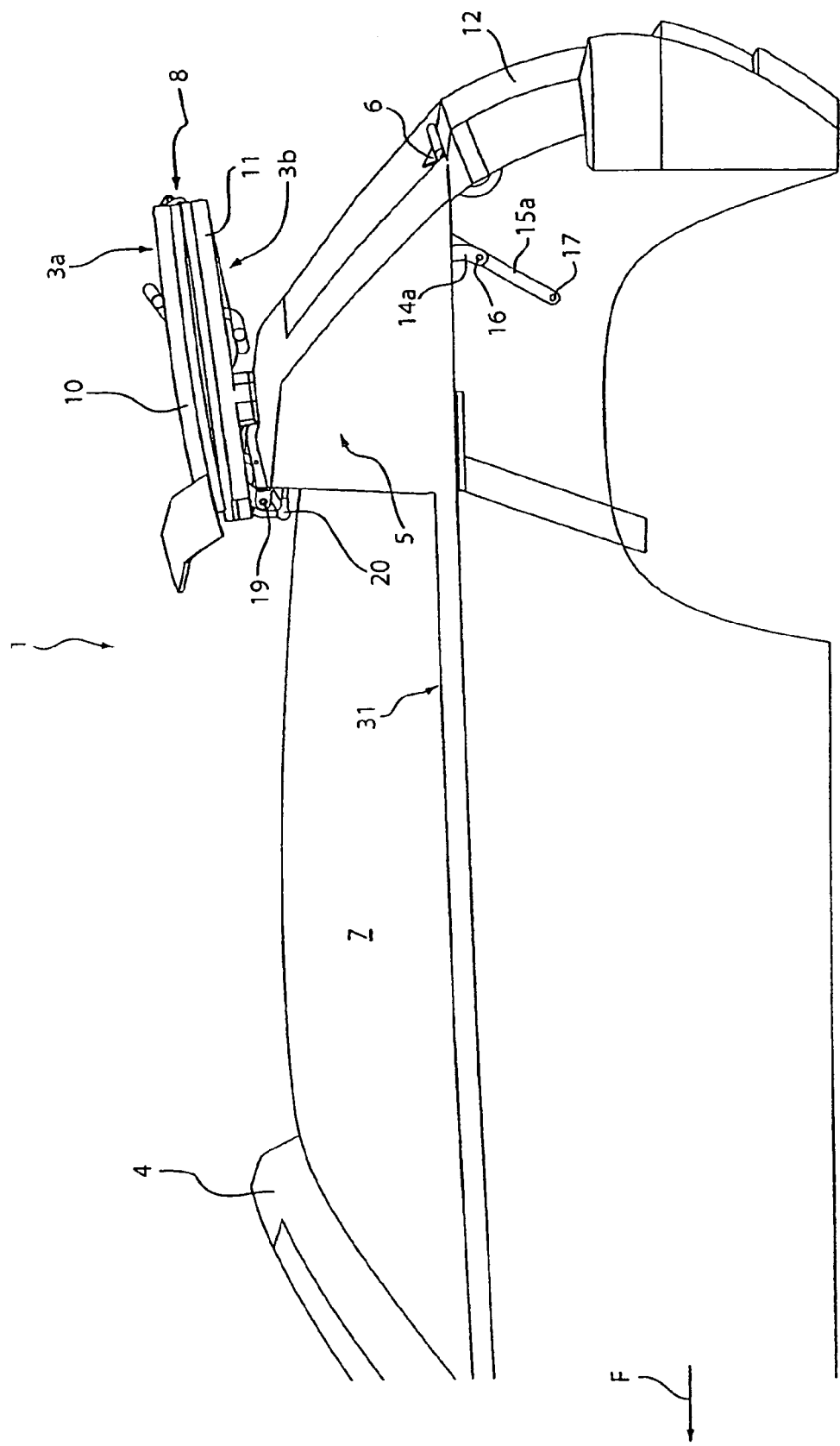
FIG. 10 shows the lowered position according to FIG. 9 but in a side view of the vehicle.

To convert the movable roof part 3 from the closed position shown in FIG. 1 to the first open position shown in FIGS. 9, 10 and 13, in which it is held above the rear roof part 5, the roof bow 27—and thus the rear end of the movable roof part 3—is first raised (FIG. 2, FIG. 11). In this position, the roof part 3 can be moved relative to the rear roof part 5. The rear roof part 5 remains unmoved during this process, in contrast to the adjustment of the second lowered position according to FIGS. 3 to 8. As is clear from the transition from FIG. 11 to FIG. 12, first the drive element 18 is moved out to initiate the upward swiveling movement of the roof part 3 about the axis 19 in the direction of arrow 21. At the same time, a linkage part 30 forces the parts 3a and 3b to fold about the separating line 8. In the illustrated embodiment, the frame sections 10, 11 are each hinged together by hinges near the edges.

In this process, the linkages 14, 15 are not swiveled about their bearings 16, 17, which are fixed with respect to the automobile body. The bearing 24 thus maintains its position, as does the pivot axis 19.

When the drive element 18 is moved out further, the roof part 3b swivels farther in the direction of arrow 21 until an flip-over position has been reached. At the same time, parts 3a and 3b are folded together until they lie almost parallel one above the other (FIGS. 9, 10, 13).

Since the axis 19 maintains its position, the roof parts 3a, 3b also do not change their vertical position in the direction of a lowering to the belt line 31 but rather are lowered in the elevated position above the rear roof part 5. As FIG. 10 shows, the stack of the front roof part 3 formed in this way is sufficiently short in the longitudinal direction of the vehicle that it does hot extend beyond the rear roof part or thus beyond the rear end of the vehicle.

Furthermore, the folded stack, in which the frame parts 10 and 11 lie one on top of the other, is very flat, so that the air resistance of the vehicle is only slightly increased by this lowered position of the roof. As a result of the fact that only a part 3 of the roof 2 is moved and that it is moved only in one plane, the movement is accomplished much faster than a full opening or a lowering of the roof part 3 below the belt line 31. The trunk is unaffected by this, as is visibility to the rear. Nevertheless, with the side windows down, a spacious open-air feeling is obtained. In this lowered position of the roof, the rear roof part 5 is in the same position as when the roof is completely closed (FIG. 1).

On the other hand, to convert the movable roof part 3 from the closed position shown in FIG. 1 to the second open position shown in FIGS. 8 and 16, in which it is held below the rear roof part 5, once again the roof bow 27—and thus the rear end of the movable roof part 3—is first raised (FIG. 2, FIG. 11). In this position, the roof part 3 can be moved relative to the rear roof part 5. The rear roof part 3 is then swiveled to the rear, either completely or with the lateral parts 5b kept in place, about a rear horizontal axis 33 in such a way that a space for the passage of the front roof part 3 is created above a stationary roll bar 32 located there. As a result of the fact that the rear window 6 was first moved down into the tailgate 12, the swiveling movement can take place without obstruction by the window 6. The movement of the roof part 3 is then carried out as described above by first moving out the drive element 18 (transition from FIG. 11 to FIG. 12) to initiate the upward swiveling movement of the roof part 3 about the axis 19 in the direction of arrow 21 and to cause the parts 3a and 3b to fold about the separating line 8.

Figure 5:
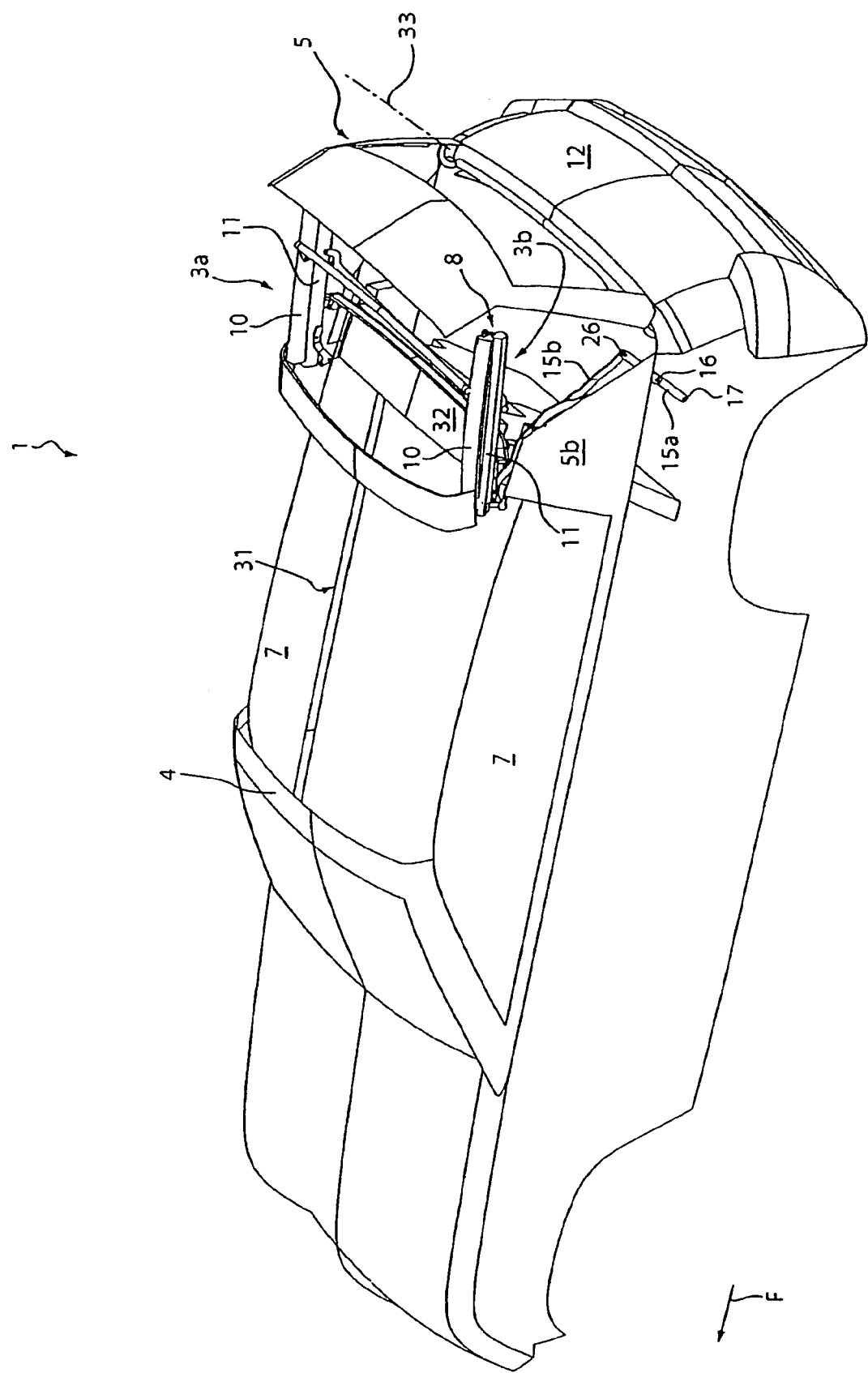
FIG. 5 shows a view similar to that of FIG. 4 in a nearly horizontal and completely folded position of the front roof part.
Figure 6:
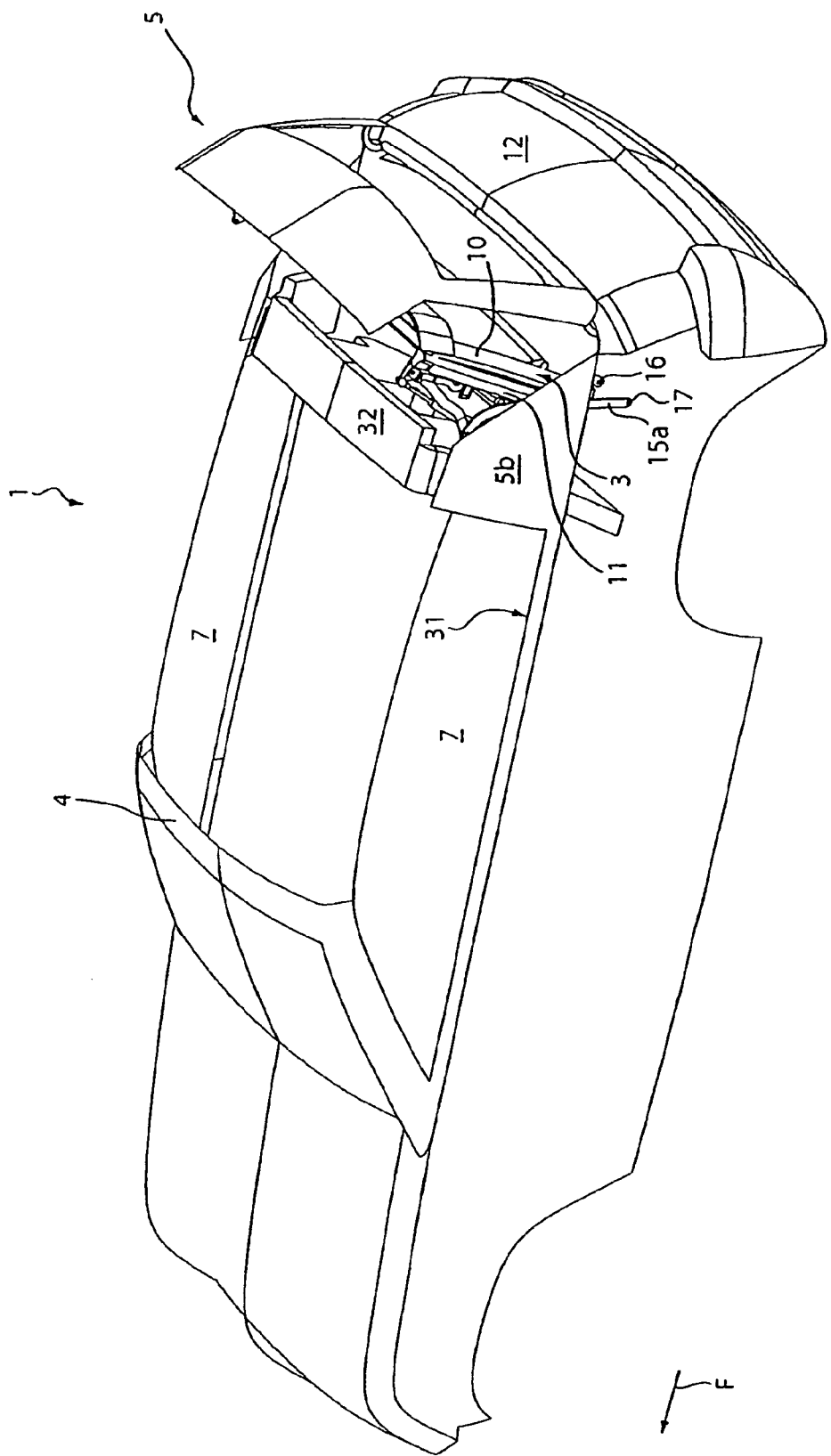
FIG. 6 shows a view similar to that of FIG. 5 in a nearly vertical intermediate position of the front roof part in the automobile body.
Figure 7:
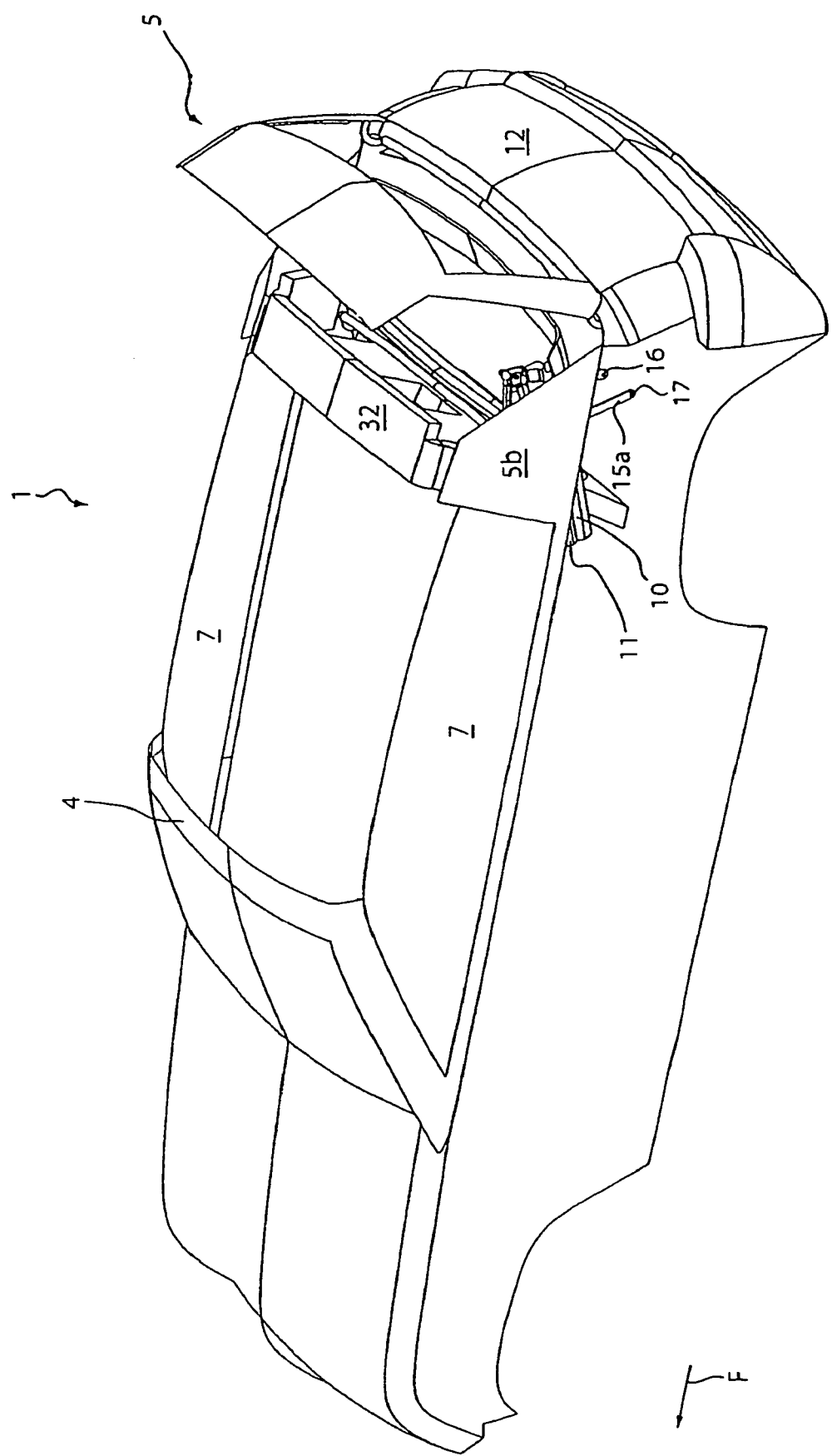
FIG. 7 shows a view similar to that of FIG. 6 with the front roof section swung further in to reach its lowered position in the automobile body.

Here again, in this process, the linkages 14, 15 at first are not yet swiveled about their bearings 16, 17, which are fixed with respect to the automobile body. The bearing 24 still maintains its position, as does the pivot axis 19, until the flip-over position of the roof part 3b as shown in FIG. 5 has been reached.

This position of the movable roof part 3 corresponds to the position shown in FIG. 9, except that now the rear roof part 5 is open to create a passage for the further lowering of the roof part 3 into the automobile body. For this purpose, the links 14a and 14b become oriented more steeply relative to each other, i.e., the angle between them at the joint 24 becomes smaller. At the same time, the section 15a swivels about the axis 17 opposite the direction of arrow 23 out of the position shown in FIGS. 9, 10 and 13, so that the angle between the sections 15a and 15b is decreased, and at the same time the angle between sections 15b and 15c is increased. With the link 14b swiveling about the axis 24, the stack of roof parts 3a and 3b is thus also swiveled into a nearly vertical position (FIG. 14), and, as the movement continues (FIGS. 15 and 16 and FIGS. 6 to 8), the stack of roof parts 3a and 3b then swivels into a position that approaches a horizontal flip-over position of the roof part 3a. In this position, the roof part 3 is then held horizontally or obliquely below the roof part 5, which can then swivel back into its original position about the axis 33 (FIG. 8). Accordingly, a targa-top vehicle is formed according to FIG. 8. In this position, the rear roof part 5 is in the same position as when the roof is completely closed (FIG. 1). In an alternative vehicle or even in the same vehicle, depending on the design, it is also possible for the rear roof part 5 to be (optionally) lowered below the belt line 31 over the stack of the front roof part 3 to form a full convertible.

A stationary and thus less expensive roll bar 32 can be used on the basis of the lowering kinematics. Moreover, in the illustrated embodiment, the roll bar 32 is covered by the rear roof part 5 in every position of the roof—and thus in every lowered position of the movable roof part 3—and is thus visually inconspicuous and invisible from the outside.

The invention claimed is:

1. Motor vehicle (1) with a roof (2), which has at least one part (3) that is fully movable to allow the roof to be opened, that extends from an area adjacent to a windshield frame (4) to a rear, especially rigid, roof part (5), that occupies the entire width in the transverse direction of the roof between the upper edges of the side windows (7) of the motor vehicle (1), and that comprises a foldable linkage that includes lateral frame parts (10; 11), wherein the movable roof part (3), together with its linkage, can be folded and in its completely open position, can be lowered completely above the rear roof part (5), which has remained unmoved compared to its closed position.

2. Motor vehicle (1) with a roof (2), which has at least one part (3) that is fully movable to allow the roof to be opened and that extends from an area adjacent to a windshield frame (4) to a rear, especially rigid, roof part (5), especially in accordance with claim 1, wherein in its completely open position, the movable roof part (3) can be lowered optionally above or below the rear roof part (5).

3. Motor vehicle in accordance with claim 1, wherein the movable roof part (3) has a textile covering.

4. Motor vehicle in accordance with claim 1, wherein the rear roof part (5) is in the same position in each fully opened position of the movable roof part (3) and in the fully closed position of the movable roof part (3).

5. Motor vehicle in accordance with claim 1, wherein the rear roof part (5) can be lowered below a belt line (31) of the automobile body.

6. Motor vehicle in accordance with claim 1, wherein the rear roof part (5) covers a rigid roll bar (32).

7. Motor vehicle in accordance with claim 1, wherein the rear roof part (5) is at least partially movable to create an opening for the passage of the movable roof part (3) to allow the latter to be lowered below the rear roof part (5).

8. Motor vehicle in accordance with claim 7, wherein the rear roof part (5) can be swung open at least partially about a rear axis (33) to create an opening for the passage of the roof part (3) and can be swung closed again over the lowered roof part (3).

9. Motor vehicle in accordance with claim 1, wherein the rear section (27) of the movable part (3) can be raised while the roof part (3) remains otherwise closed.

10. Motor vehicle in accordance with claim 9, wherein the rear section (27) can be moved into and out of its raised position while the vehicle is traveling.

11. Motor vehicle in accordance with claim 9, wherein to allow the rear section to be raised, a roof bow (27) is provided which grips beneath the rear section and is displaceably mounted on lateral frame parts (11) of the movable roof part (3).

* * * * *